US008869075B2

(12) United States Patent
Sun et al.

(10) Patent No.: US 8,869,075 B2
(45) Date of Patent: Oct. 21, 2014

(54) LOCALLY OPTIMIZED COLORING FOR CLEANING LITHOGRAPHIC HOTSPOTS

(71) Applicant: GLOBALFOUNDRIES Inc., Grand Cayman (KY)

(72) Inventors: Yuyang Sun, Wappingers Falls, NY (US); Chidambaram Kallingal, Poughkeepsie, NY (US); Marc Tarabbia, Pleasant Valley, NY (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 0 days.

(21) Appl. No.: 13/717,816

(22) Filed: Dec. 18, 2012

(65) Prior Publication Data

US 2014/0173533 A1    Jun. 19, 2014

(51) Int. Cl.
*G06F 17/50* (2006.01)

(52) U.S. Cl.
CPC .................................. *G06F 17/5081* (2013.01)
USPC ............................................. 716/52; 716/51

(58) Field of Classification Search
CPC .. G06F 17/5081; G06F 2217/12; G03F 1/144
USPC .................................................... 716/51, 52
See application file for complete search history.

(56) References Cited

U.S. PATENT DOCUMENTS

| 4,647,346 | A | 3/1987 | Miller et al. | |
| 6,856,376 | B2 | 2/2005 | Heerens et al. | |
| 6,884,984 | B2 | 4/2005 | Ye et al. | |
| 7,628,865 | B2 | 12/2009 | Singh | |
| 7,927,969 | B2 | 4/2011 | Martin | |
| 8,037,428 | B2 | 10/2011 | Tong et al. | |
| 2006/0218520 | A1* | 9/2006 | Pierrat et al. | 716/19 |
| 2007/0251543 | A1 | 11/2007 | Singh | |
| 2009/0300561 | A1* | 12/2009 | Tong et al. | 716/5 |
| 2010/0083208 | A1* | 4/2010 | Lai et al. | 716/8 |
| 2010/0115489 | A1* | 5/2010 | Song et al. | 716/19 |

(Continued)

FOREIGN PATENT DOCUMENTS

EP            1 329 773 A3       7/2003

OTHER PUBLICATIONS

Duo Ding et al., "High Perfomance Lithography Hotspot Detection with Hierarchically Refined Machine Learning Methods", IEEE International Workshop on DFM&Y, Jun. 14, 2010, 4 pages.

(Continued)

*Primary Examiner* — Vuthe Siek
(74) *Attorney, Agent, or Firm* — Hunter E. Webb; Keohane & D'Alessandro, PLLC

(57) ABSTRACT

Approaches for cleaning/resolving lithographic hotspots (e.g., during a simulation phase of semiconductor design) are provided. Typically, a hotspot will be identified in a first polygon (having a first color) of a lithographic pattern or contour. Once a hotspot has been identified, a location (e.g., another portion of the first polygon or in a second polygon of the lithographic pattern having the first color) proximate the hotspot will be identified to place a stitch marker. Once the location has been identified, a stitch marker will be placed at that location. Then, a color of the stitch marked location will be changed to a second color, and the resulting lithographic pattern can be further processed to clean/resolve the hotspot.

20 Claims, 5 Drawing Sheets

(56) References Cited

U.S. PATENT DOCUMENTS

| | | |
|---|---|---|
| 2010/0269082 A1 | 10/2010 | Majumder et al. |
| 2010/0324878 A1 | 12/2010 | Lee et al. |
| 2011/0211748 A1* | 9/2011 | Xiao et al. ............... 382/144 |
| 2012/0015857 A1 | 1/2012 | Chen et al. |
| 2012/0103221 A1 | 5/2012 | Stowe et al. |
| 2012/0210280 A1 | 8/2012 | Tong |

OTHER PUBLICATIONS

Solid State Technology, Insights for Electronics Manufacturing, "A methodology and system for automatic litho hot-spot repair", Nov. 1, 2012, vol. 55, Issue 9, 6 pages.

Maharaj Mukherjee et al., "Optical rule checking for proximity-corrected mask shapes", SPIE Proceedings, vol. 5040, Image Quality and Design Rules, Jun. 25, 2003, 3 pages.

* cited by examiner

LOCALLY OPTIMIZED COLORING FOR CLEANING LITHOGRAPHIC HOTSPOTS

BACKGROUND

1. Technical Field

This invention relates generally to the field of semiconductors and, more particularly, to approaches for locally optimizing "coloring" to clean/resolve lithographic hotspots.

2. Related Art

Advances in integrated circuit (IC) manufacturing technology have enabled feature sizes on IC chips to continuously decrease. Approaches that consider both yield and reliability during the physical-design process are becoming increasingly important in synergizing design and manufacturing for nanometer-scale fabrication processes. Many yield and reliability issues of existing approaches can be attributed to certain layout configurations, referred to as "process hotspots" or "hotspots," which are susceptible to process issues such as stress and lithographic process fluctuations. It is therefore desirable to identify and remove these process hotspot configurations and replace them with more yield-friendly configurations.

Recent approaches in hotspot detection and repair either perform intensive simulation (e.g., optical simulation based on the "Hopkins" formula) or are based on heuristics and/or design rules provided by other rule-based or model-based design checking tools. Such approaches are either computationally intensive and are thus inherently slow, or are inaccurate due to the nature of the design rules, guidelines, or heuristics. Moreover, some of these recent approaches distinguish between pre-optical proximity correction (pre-OPC) and post-OPC in terms of hotspot detection and fixing. Some approaches even require the performance of OPC simulation, while other approaches determine the correlation and similarity between the pre-OPC and post-OPC stages in terms of the OPC, and apply the same simulation for both the pre-OPC and post-OPC hotspot detection and fixing. As such, it is very difficult to efficiently achieve reliable result in hotspot repair using existing approaches.

SUMMARY

In general, aspects of the present invention relate to approaches for cleaning/resolving lithographic hotspots (e.g., during a simulation phase of semiconductor design). Typically, a hotspot will be identified in a first polygon (having a first color) of a lithographic pattern or contour. Once a hotspot has been identified, a location (e.g., another portion of the first polygon or in a second polygon of the lithographic pattern having the first color) proximate the hotspot will be identified to place a stitch marker. Once the location has been identified, a stitch marker will be placed at that location. Then, a color of the stitch marked location will be changed to a second color, and the resulting lithographic pattern can be further processed to clean/resolve the hotspot.

A first aspect of the present invention provides a method for cleaning lithographic hotspots, comprising: identifying a hotspot in a lithographic pattern; identifying a location proximate the hotspot to place a stitch marker; placing a stitch marker at the location; and re-coloring the lithographic pattern proximate the stitch marker to clean the hotspot.

A second aspect of the present invention provides a method for cleaning lithographic hotspots, comprising: identifying a hotspot in a first polygon of a lithographic pattern; identifying a location in a second polygon proximate the hotspot to place a stitch marker; placing a stitch marker at the location; and re-coloring the second polygon proximate the stitch marker to clean the hotspot.

A third aspect of the present invention provides a method for cleaning lithographic hotspots, comprising: identifying a hotspot in a first polygon of a lithographic pattern, the first polygon having a first color; identifying a location in a second polygon of the lithographic pattern proximate the hotspot to place a stitch marker, the second polygon having the first color; placing a stitch marker at the location; and changing at least a portion of the second polygon proximate the stitch marker to a second color to clean the hotspot.

BRIEF DESCRIPTION OF THE DRAWINGS

These and other features of this invention will be more readily understood from the following detailed description of the various aspects of the invention taken in conjunction with the accompanying drawings in which.

Figure 1:
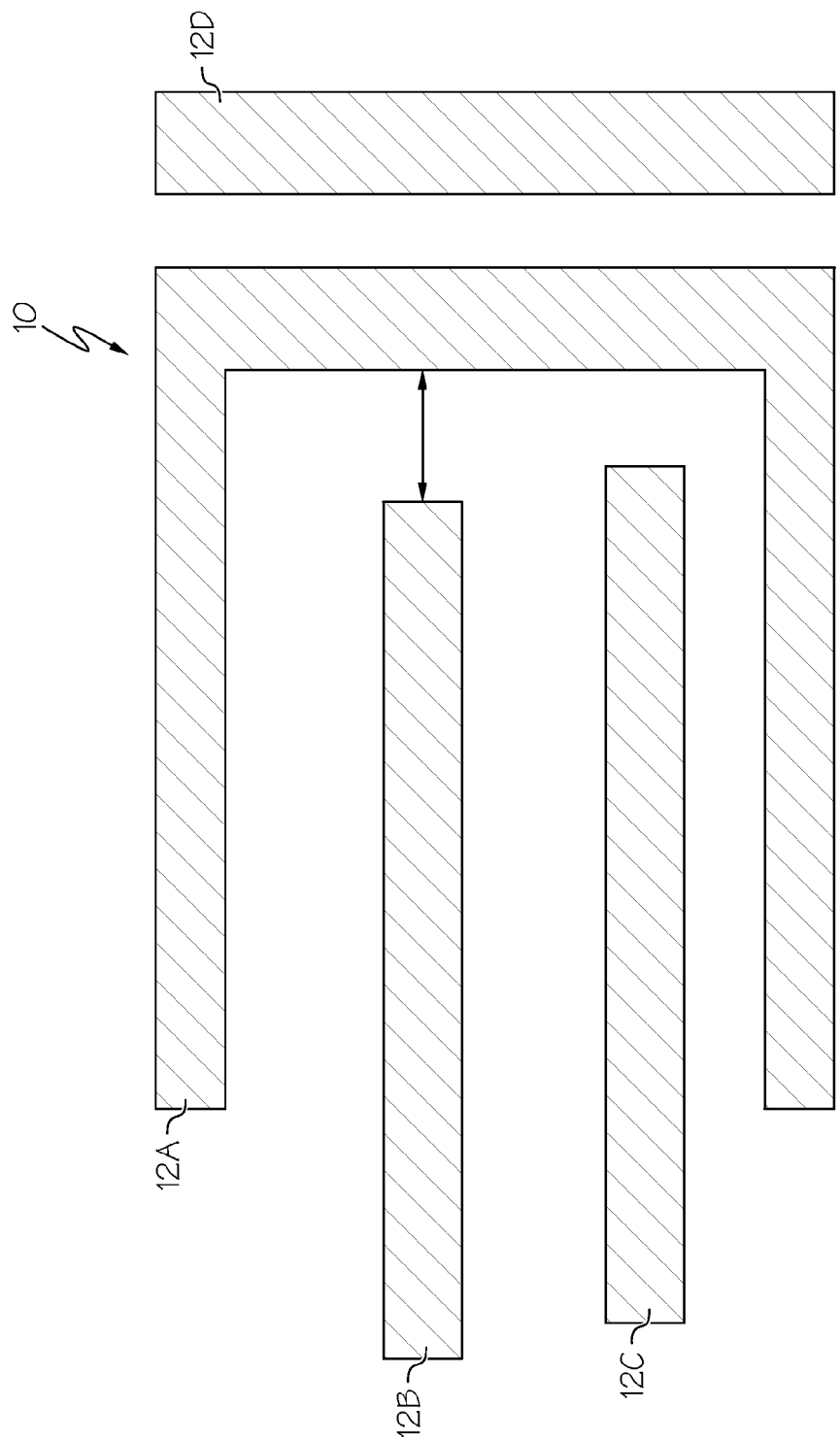
FIG. 1 shows a single color lithographic design according to an embodiment of the present invention.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "embodiments," "exemplary embodiments," or similar language, means that a particular feature, structure, or characteristic described in connection with the embodiment is included in at least one embodiment of the present invention. Thus, appearances of the phrases "in one embodiment," "in an embodiment," "in embodiments" and similar language throughout this specification may, but do not necessarily, all refer to the same embodiment.

The terms "overlying" or "atop", "positioned on" or "positioned atop", "underlying", and "beneath" or "below" mean that a first element, such as a first structure (e.g., a first layer) is present on a second element, such as a second structure (e.g. a second layer) wherein intervening elements, such as an interface structure (e.g. interface layer) may be present between the first element and the second element.

In general, aspects of the present invention relate to approaches for cleaning/resolving lithographic hotspots (e.g., during a simulation phase of semiconductor design). Typically, a hotspot will be identified in a first polygon (having a first color) of a lithographic pattern or contour. Once a hotspot has been identified, a location (e.g., another portion of the first polygon or in a second polygon of the lithographic pattern having the first color) proximate the hotspot will be identified to place a stitch marker. Once the location has been identified, a stitch marker will be placed at that location. Then, a color of the stitch marked location will be changed to a second color, and the resulting lithographic pattern can be further processed to clean/resolve the hotspot.

As described above, lithographic hotspots can greatly impact device performance. The approaches described herein utilize "locally optimized coloring" for multiple patterning technology to enhance the yield of ICs. The approaches described herein are typically compatible with double patterning flow. In addition, the locally optimized coloring layout and hotspot repair described herein could be added to a hotspot library for an automatic fix. Still yet, the approaches described herein could be applied to pitch splitting litho-etch-litho-etch (LELE) and other multiple patterning techniques.

Figure 2:
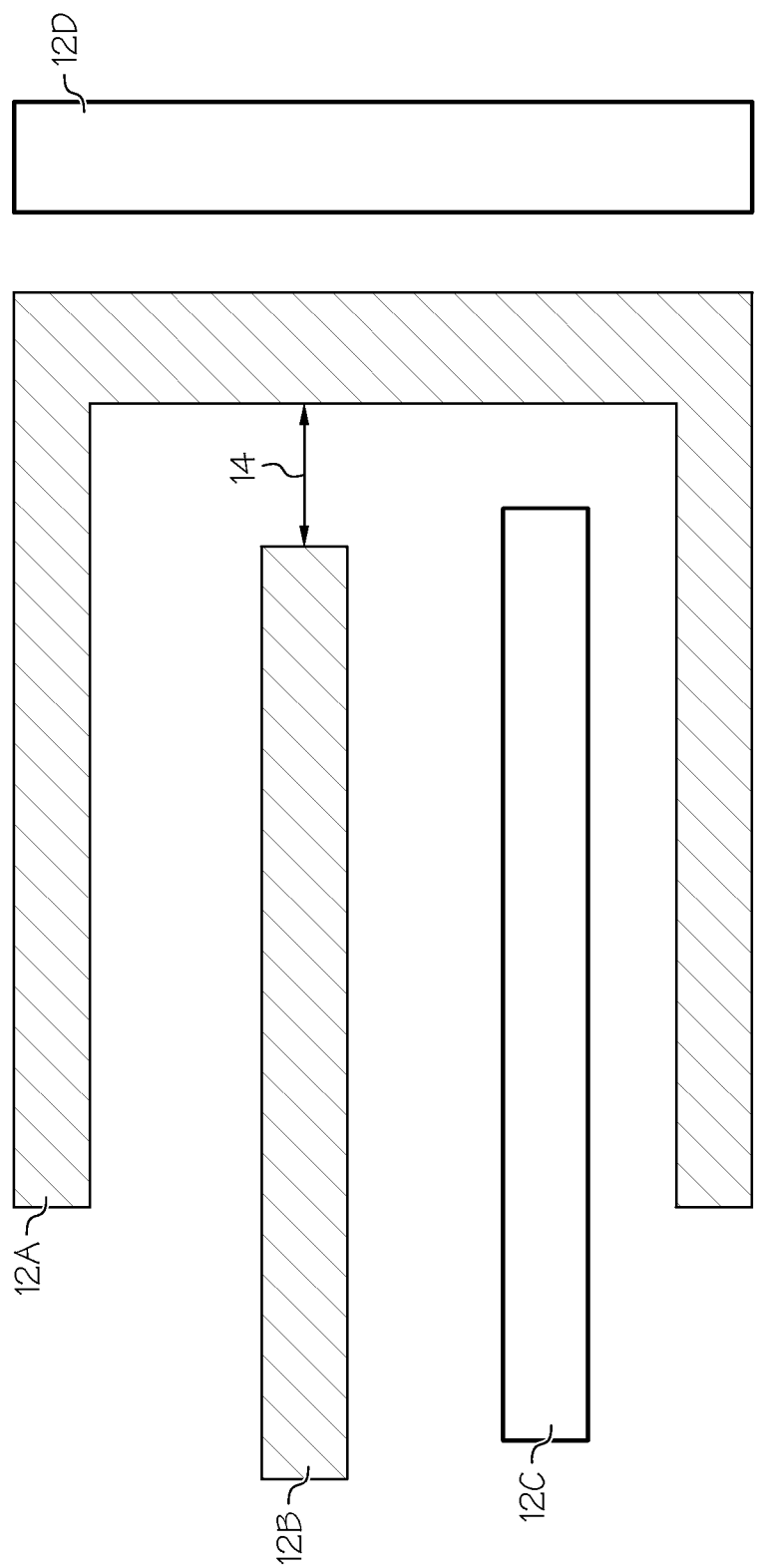
FIG. 2 shows a multi-color lithographic design according to an embodiment of the present invention.
Figure 3:
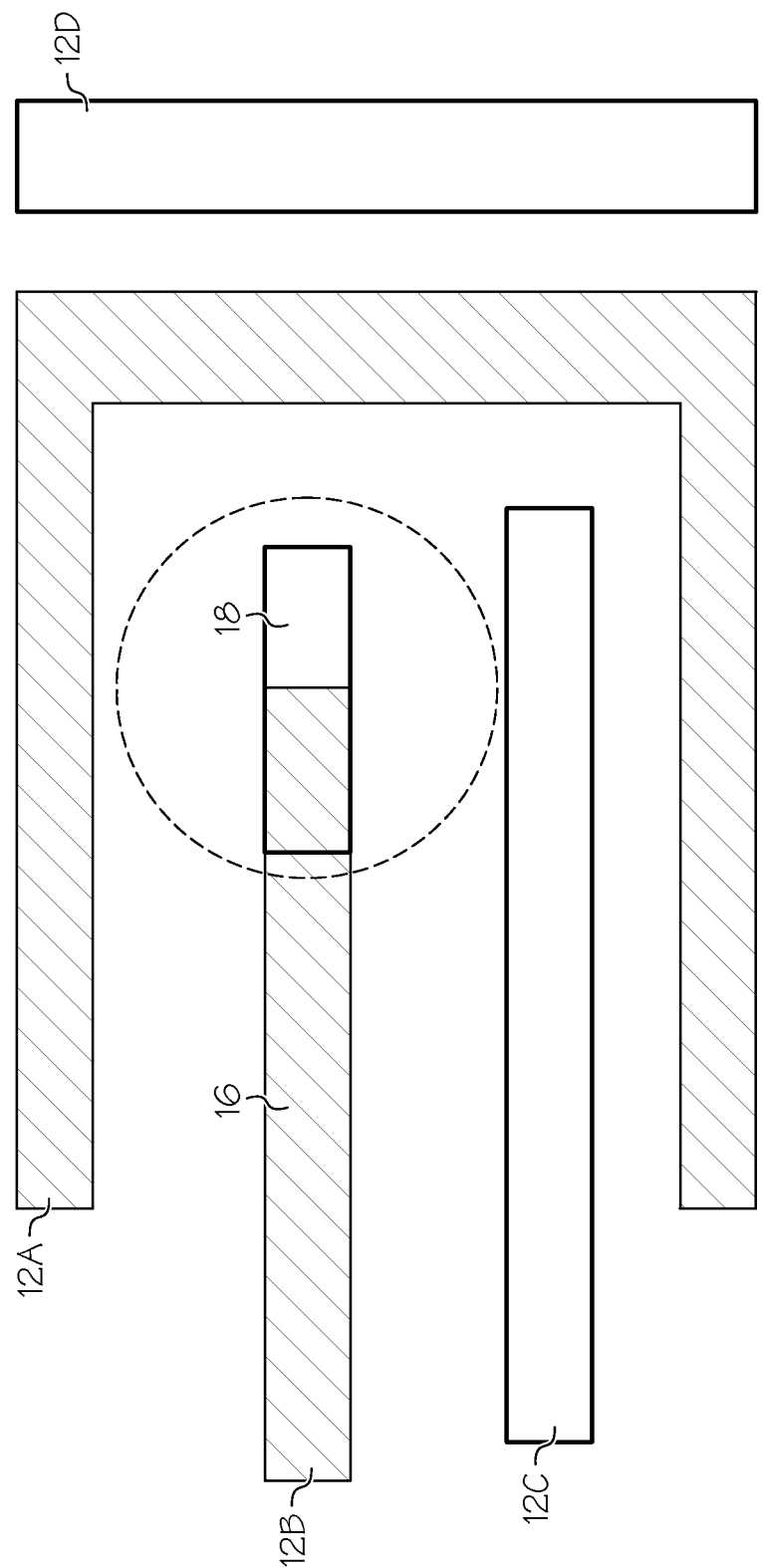
FIG. 3 shows another multi-color lithographic design according to an embodiment of the present invention.

Referring now to FIG. 1, an example of coloring patterning according to an embodiment of the present invention is shown. As depicted, a lithographic pattern 10 is provided with a set of polygons 12A-D. As further shown, polygons 12A-D may have a common color. However, this need not be the case. Rather, multiple colors may be introduced in different coloring designs/schemes. For example, as shown in FIG. 2, polygons 12C and 12D have a different color than polygons 12A and 12B. In general, however, it is desirable to increase the space between two like-colored polygons. As shown, the space 14 between polygons 12A and 12B is minimal. This can give rise to hotspots. Another coloring decomposition approach is shown in FIG. 3. As depicted, polygons 12C and 12D are similarly colored. As further shown, portion 16 of polygon 12B is colored similarly to polygon 12A, while portion 18 of polygon 12B is colored similar to polygons 12C and 12D. This capability to locally color/decompose individual polygons can be utilized to resolve hotspots hereunder.

Figure 4:
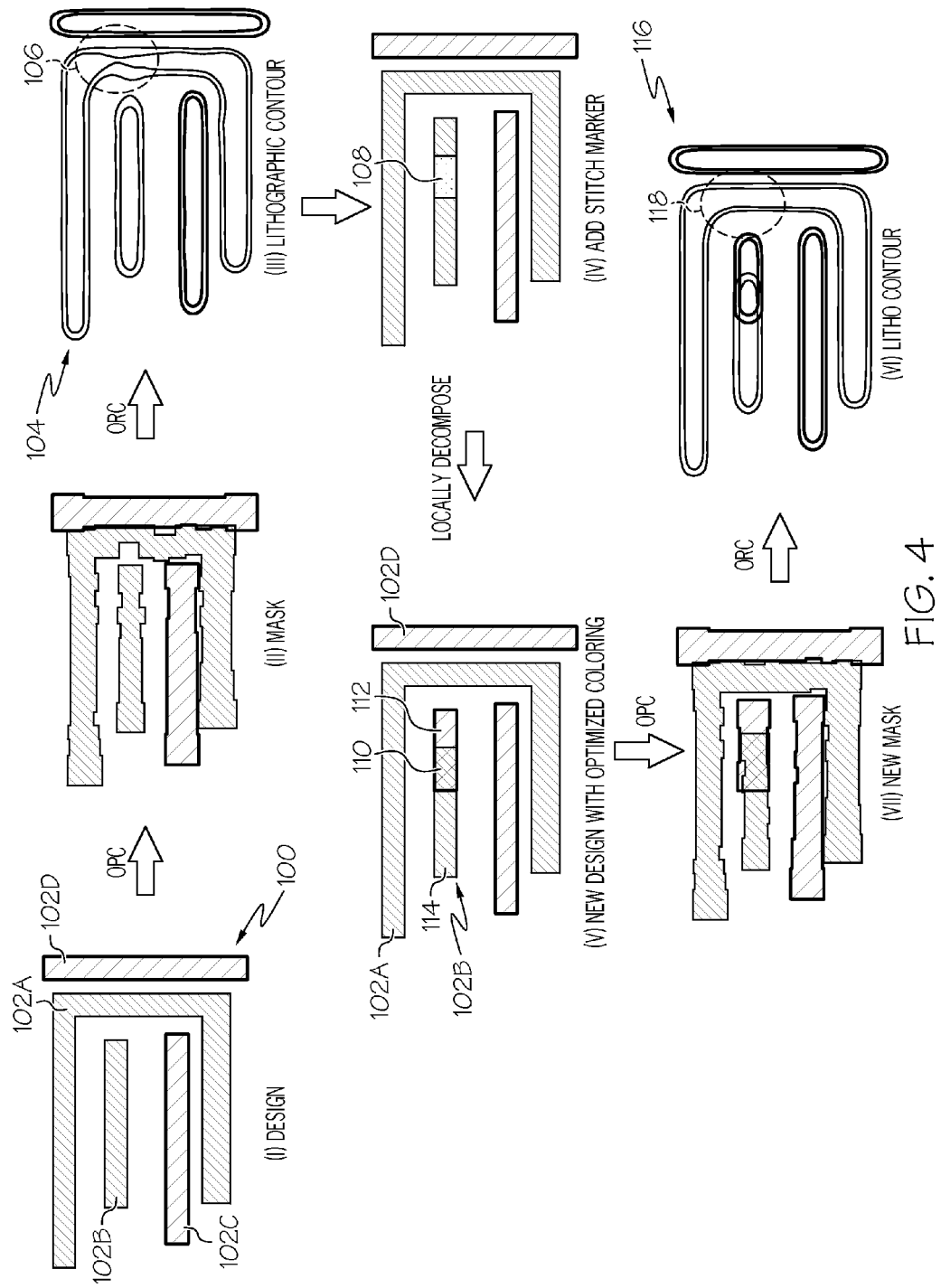
FIG. 4 shows a process flow diagram for resolving lithographic hotspots according to an embodiment of the present invention.

Referring to FIG. 4, a process flow diagram (steps I-VII) according to an aspect of the present invention is shown. As depicted in step I, a design 100 having polygons 102A-D is provided. Polygons 102A and 102B are similarly colored, while polygons 102C and 102D are similarly colored. An OPC process/procedure is performed, and a mask is applied in step II. In step III, an ORC process is then performed to yield contours in polygons 104 as shown. As further shown in step III, the closeness of like-colored polygons 102B and 102A may yield hotspot 104. To address this, the aspects described herein will identify a location proximate hotspot 106 (e.g., on an adjacent polygon contributing to the issue such as polygon 102B, or on polygon 102A itself) to add a stitch marker 108. Once this is done, stitch marker 108 will be added at that location in step IV. Then a location proximate stitch marker 108 will be locally decomposed/re-colored. As depicted in step V, this local decomposition diversifies/differentiates the coloration of polygon 102B such that portion 112 of polygon 102B closest to polygon 102A (and hotspot 106) is a different color than polygon 102A. Conversely, this allows portion 114 of polygon 102B to remain in its original color (e.g., the same color as polygon 102A). Portion 110 of polygon 102B under stitch marker 108 can be colored either color, a third color, or some combination thereof. Now, the similarly colored portions of polygons 102A and 102B will not be in the close proximity that resulted in hotspot 106. After decomposition has been completed, another OPC process and masking can be performed in step VI, followed by another ORC process in step VII. As can be seen, polygon 102A of contour 116 has been cleaned in area 118 such that hotspot 106 is no longer present.

Figure 5:
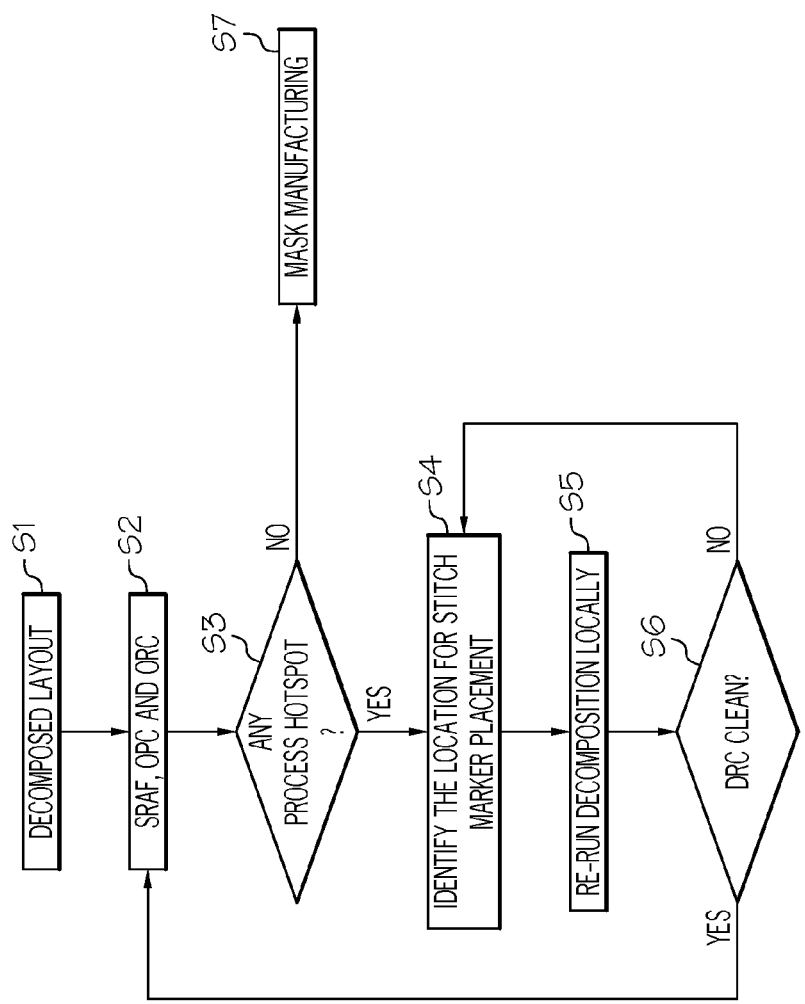
FIG. 5 shows a method flow diagram according to an embodiment of the present invention.

Referring now to FIG. 5, a method flow diagram describing these concepts is shown. As depicted, in step S1, a decomposed layout is provided. In step S2, sub-resolution assist features (SRAF), OPC, and ORC processes are performed. In step S3, it is determined if any hotspots are present. If not, mask manufacturing will occur in step S7. If so, the location for placing or adding a stitch marker will be identified in step S4, and a local decomposition will be run (or re-run) in step S5. Then, in step S6, it will be determined whether the design is clean. If not, the process will return to step S4. If so, the process will return to step S2. Once any hotspots no longer exist, mask manufacturing will occur in step S7.

In various embodiments, design tools can be provided and configured to create the data sets used to pattern the semiconductor layers as described herein. For example, data sets can be created to generate photomasks used during lithography operations to pattern the layers for structures as described herein. Such design tools can include a collection of one or more modules and can also include hardware, software, or a combination thereof. Thus, for example, a tool can be a collection of one or more software modules, hardware modules, software/hardware modules, or any combination or permutation thereof. As another example, a tool can be a computing device or other appliance on which software runs or in which hardware is implemented. As used herein, a module might be implemented utilizing any form of hardware, software, or a combination thereof. For example, one or more processors, controllers, application-specific integrated circuits (ASIC), programmable logic arrays (PLA)s, logical components, software routines, or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

While the invention has been particularly shown and described in conjunction with exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the formation and/or processing of structures illustrated and described herein as well as in association with other structures not illustrated. Therefore, it is to be understood that the appended claims are intended to cover all such modifications and changes that fall within the true spirit of the invention.

What is claimed is:

1. A method for cleaning lithographic hotspots, comprising:
   identifying, using a computer device, a hotspot in a lithographic pattern;
   identifying a location proximate the hotspot to place a stitch marker;
   placing a stitch marker at the location; and
   re-coloring the lithographic pattern proximate the stitch marker to a different color to clean the hotspot, relative positions of polygons in the lithographic pattern remaining unchanged.

2. The method of claim 1, the hotspot being identified on a first polygon of the lithographic pattern.

3. The method of claim 2, the first polygon having a first color.

4. The method of claim 3, the location being on a second polygon that is proximate the first polygon, and the second polygon having the first color, the location being outside of the hotspot on an adjacent polygon that is contributing to a causation of the hotspot.

5. The method of claim 4, the re-coloring comprising changing the color of the second polygon proximate the stitch marker from the first color to a second color.

6. The method of claim 1, the re-coloring minimizing a space between like-colored portions of the lithographic portions.

7. The method of claim 1, the hotspot being identified in a lithographic contour of the lithographic pattern.

8. The method of claim 7, further comprising:
   performing an optical proximity correction (OPC) process after the re-coloring; and
   performing an optical rule check (ORC) process after the OPC process to clean the hotspot from the lithographic contour.

9. A method for cleaning lithographic hotspots, comprising:
   identifying, using a computer device, a hotspot in a first polygon of a lithographic pattern;
   identifying a location in a second polygon proximate the hotspot to place a stitch marker, the location being outside of the hotspot on an adjacent polygon that is contributing to a causation of the hotspot;
   placing a stitch marker at the location; and
   re-coloring the second polygon proximate the stitch marker to a different color to clean the hotspot, relative positions of polygons in the first and second polygons remaining unchanged.

10. The method of claim 9, the first polygon having a first color.

11. The method of claim 10, the re-coloring comprising changing a color of the second polygon proximate the stitch marker from the first color to a second color.

12. The method of claim 9, the re-coloring minimizing a space between like-colored portions of the first polygon and the second polygon.

13. The method of claim 9, the hotspot being identified in a lithographic contour of the lithographic pattern.

14. The method of claim 13, further comprising:
   performing an optical proximity correction (OPC) process after the re-coloring; and
   performing an optical rule check (ORC) process after the OPC process to clean the hotspot from the lithographic contour.

15. A method for cleaning lithographic hotspots, comprising:
   identifying, using a computer device, a hotspot in a first polygon of a lithographic pattern, the first polygon having a first color;
   identifying a location in a second polygon of the lithographic pattern proximate the hotspot to place a stitch marker, the second polygon having the first color, the location being outside of the hotspot on an adjacent polygon that is contributing to a causation of the hotspot;
   placing a stitch marker at the location; and
   changing at least a portion of the second polygon proximate the stitch marker to a second color to clean the hotspot, relative positions of polygons in the first and second polygons remaining unchanged.

16. The method of claim 15, the changing of the color minimizing a space between like-colored portions of the first polygon and the second polygon.

17. The method of claim 15, the hotspot being identified in a lithographic contour of the lithographic pattern.

18. The method of claim 17, further comprising:
   performing an optical proximity correction (OPC) process after the changing; and
   performing an optical rule check (ORC) process after the OPC process to clean the hotspot from the lithographic contour.

19. The method of claim 15, the changing comprising performing a decomposition of at least a portion of the second polygon proximate the stitch marker.

20. The method of claim 15, the method being performed during a simulation phase of lithographic design.

* * * * *